US012172088B2

(12) United States Patent
Cahill et al.

(10) Patent No.: US 12,172,088 B2
(45) Date of Patent: Dec. 24, 2024

(54) SHARED AUGMENTED REALITY GAME WITHIN A SHARED COORDINATE SPACE

(71) Applicant: Microsoft Technology Licensing, LLC, Redmond, WA (US)

(72) Inventors: Jason Matthew Cahill, Woodinville, WA (US); Jesse Dylan Merriam, Bothell, WA (US); Torfi Frans Olafsson, Kirkland, WA (US); Timothy James Schutz, Duvall, WA (US); Michael Meincke Persson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 17/379,347

(22) Filed: Jul. 19, 2021

(65) Prior Publication Data

US 2021/0346810 A1 Nov. 11, 2021

Related U.S. Application Data

(62) Division of application No. 16/414,591, filed on May 16, 2019, now Pat. No. 11,097,194.

(51) Int. Cl.
*A63F 13/00* (2014.01)
*A63F 13/335* (2014.01)
(Continued)

(52) U.S. Cl.
CPC .......... *A63F 13/847* (2014.09); *A63F 13/335* (2014.09); *G06T 19/006* (2013.01); *H04L 67/131* (2022.05)

(58) Field of Classification Search
CPC ........ G06T 19/006; G06T 19/20; G06T 19/00
See application file for complete search history.

(56) References Cited

U.S. PATENT DOCUMENTS 9,607,243 B1 3/2017 Brualla
9,928,661 B1 3/2018 Kinstner
(Continued)

FOREIGN PATENT DOCUMENTS

CN 103760972 A 4/2014
CN 106681674 A 5/2017
(Continued)

OTHER PUBLICATIONS

"Office Action Issued in Indian Patent Application No. 202147035680", Mailed Date: May 4, 2023, 6 Pages.
(Continued)

*Primary Examiner* — David L Lewis
*Assistant Examiner* — Eric M Thomas
(74) *Attorney, Agent, or Firm* — Rainier Patents, P.S.

(57) ABSTRACT

Described herein is a system and method for sharing an AR game within a shared coordinate space created between devices with initially disjoint relative coordinate spaces. Once the shared coordinate space is created, an AR video game can provide a first mode in which the users engage in game play action that have consequences according to pre-established game rules. The AR video game can provide a second mode ("sandbox mode") in which users engage in non-destructive game play actions that do not have consequences once the second mode has been terminated. Further described herein is a system and method of using geolocation information within an AR session in which a virtual action can be initiated by a user that causes a corresponding virtual action to be displayed on a map of a virtual environment that parallels a physical environment displayed on a user gaming device of another user.

21 Claims, 13 Drawing Sheets

(51) Int. Cl.
*A63F 13/847* (2014.01)
*G06T 19/00* (2011.01)
*H04L 67/131* (2022.01)

(56) References Cited

U.S. PATENT DOCUMENTS

| | | |
|---|---|---|
| 2012/0025976 A1 | 2/2012 | Richey |
| 2013/0281207 A1 | 10/2013 | Lyons et al. |
| 2013/0293580 A1* | 11/2013 | Spivack ............ G06Q 30/0623 345/633 |
| 2014/0128161 A1* | 5/2014 | Latta ........................ A63F 9/24 463/42 |
| 2014/0248950 A1 | 9/2014 | Tosas Bautista |
| 2014/0297617 A1* | 10/2014 | Rajakarunanayake ...................... G06F 16/29 707/724 |
| 2014/0306866 A1 | 10/2014 | Miller |
| 2016/0133230 A1 | 5/2016 | Di et al. |
| 2016/0210686 A1 | 7/2016 | Valente |
| 2017/0220104 A1 | 8/2017 | Goslin |
| 2018/0007647 A1 | 1/2018 | Bilstad |
| 2018/0213175 A1 | 7/2018 | Hlavac |
| 2018/0365853 A1 | 12/2018 | Yang et al. |
| 2018/0374269 A1 | 12/2018 | Smith |
| 2019/0356705 A1 | 11/2019 | Escudero et al. |

FOREIGN PATENT DOCUMENTS

| | | |
|---|---|---|
| CN | 108989606 A | 12/2018 |
| KR | 20100130385 A | 12/2010 |
| KR | 20170132505 A | 12/2017 |
| WO | 2018224847 A2 | 12/2018 |

OTHER PUBLICATIONS

"Office Action Issued in European Patent Application No. 20723695.1", Mailed Date: Oct. 19, 2023, 8 Pages.
"Office Action Issued in European Patent Application No. 20708386.6", Mailed Date: Jun. 2, 2023, 10 Pages.
Office Action Received for Chinese Application No. 202080036555.5, mailed on Jun. 20, 2024, 17 pages (English Translation Provided).
Thompson, et al., "Game Designs-principles, practice, and techniques", Shanghai People's Fine Arts Publishing House, Mar. 2007, pp. 122-123.
Office Action Received for Chinese Application No. 202080014844.5, mailed on Apr. 10, 2024, 14 pages (English Translation Provided).
Examination Report Received for Indian Application No. 202147047165, mailed on Nov. 3, 2023, 7 pages.
Office Action Received for Indian Application No. 202147035680, mailed on Oct. 14, 2024, 02 pages.

* cited by examiner

SHARED AUGMENTED REALITY GAME WITHIN A SHARED COORDINATE SPACE

BACKGROUND

Augmented reality (AR) systems such as video games display real world images overlaid with a virtual experience (e.g., interactive three-dimensional object(s)). An AR system thus enables a participant to view real-world imagery in combination with context-relevant, computer-generated imagery. Imagery from the real-world and the computer-generated are combined and presented to a user such that they appear to share the same physical space. In AR applications in which multiple participants share the same physical environment, inconsistent positioning of the computer-generated imagery relative to the real-world imagery can be a noticeable distraction that degrades the AR experience.

SUMMARY

Described herein is a system for sharing an augmented reality game within a shared coordinate space, comprising: a computer comprising a processor and a memory having computer-executable instructions stored thereupon which, when executed by the processor, cause the computer to: create a shared coordinate space in an augmented reality game between a plurality of user gaming devices; provide a first mode of the augmented reality game to a plurality of users associated with the plurality of user gaming devices using the created shared coordinate space, wherein in the first mode at least some of the plurality of users engage in game play actions that have consequences according to pre-established game rules; and provide a second mode of the augmented reality game to the plurality of users associated with the plurality of user gaming devices using the created shared coordinate space, wherein in the second mode at least some of the plurality of users engage in non-destructive game play actions that do not have consequences once the second mode has been terminated.

Further described herein is a method of using geolocation information within an augmented reality game, comprising: joining a plurality of user gaming devices to the augmented reality game; at a first user gaming device of the plurality of user gaming devices, determining at least one other user gaming device of the plurality of user gaming devices having a physical location within a threshold physical distance of a physical location of the first user gaming device; and at the first user gaming device, initiating a virtual action that causes a corresponding virtual action to be displayed on a map of a virtual environment that parallels at least portions of the physical environment, the map displayed on the second user gaming device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
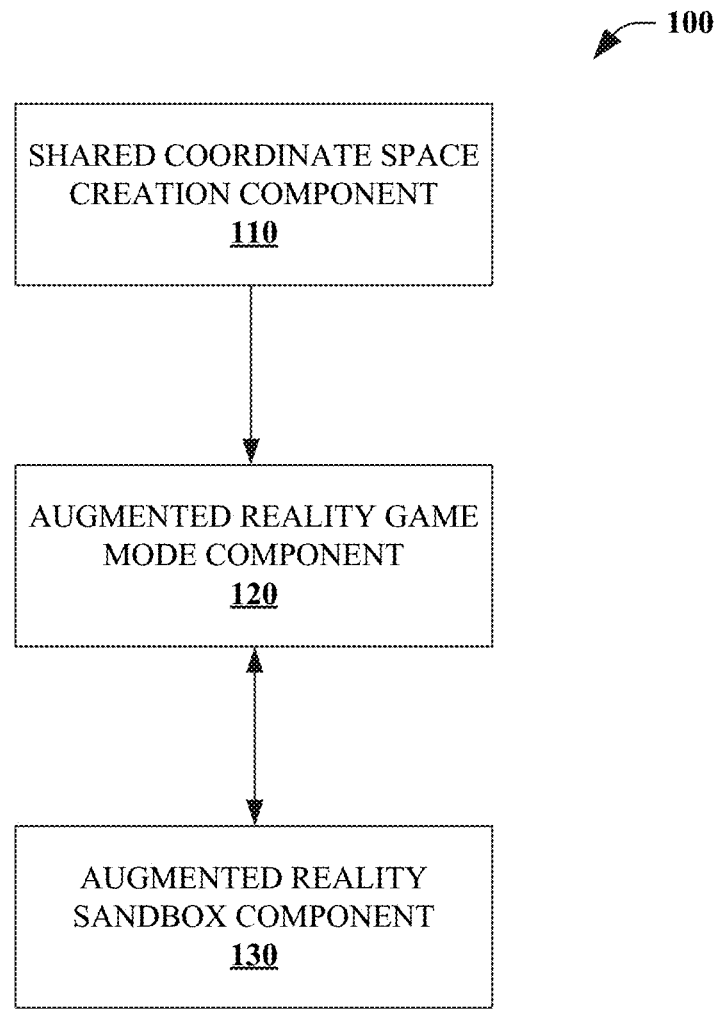
FIG. 1 is a functional block diagram that illustrates a system for sharing an augmented reality game within a shared coordinate space.

Various technologies pertaining to a shared augmented reality game within a shared coordinate space are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding a shared augmented reality game within a shared coordinate space. What follows are one or more exemplary systems and methods.

Aspects of the subject disclosure pertain to the technical problem of a shared augmented reality game within a shared coordinate space. The technical features associated with addressing this problem involve creating a shared coordinate space in an augmented reality game between a plurality of user gaming devices, each initially with disjoint relative coordinate spaces using a displayed spatial alignment image and an AR game identifier; provide a first mode of the augmented reality game to a plurality of users associated with the plurality of user gaming devices using the created shared coordinate space, wherein in the first mode at least some of the plurality of users engage in game play actions that have consequences according to pre-established game rules; and provide a second mode of the augmented reality game to the plurality of users associated with the plurality of user gaming devices using the created shared coordinate space, wherein in the second mode at least some of the plurality of users engage in non-destructive game play actions that do not have consequences once the second mode has been terminated. Accordingly, aspects of these technical features exhibit technical effects of more efficiently and effectively sharing an augmented reality game within a shared coordinate space saving computing resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

"User gaming device" refers to a moveable individual computing device including, for example, a mobile phone, a laptop, a tablet, a phablet, a personal digital assistant ("PDA"), an e-reader, a wearable computer, a head-mounted display (HMD), or any other moveable computing device having components for displaying and/or interacting with an augmented reality game (e.g., session). A "real object" is one that exists in an AR participant's surroundings. A "virtual object" is a computer-generated construct that does not exist in the participant's physical surroundings, but may be experienced (e.g., seen, heard, etc.) via the AR technology.

AR systems such as video games display real world images overlaid with a virtual experience (e.g., interactive three-dimensional object(s)). An AR system thus enables a participant to view real-world imagery in combination with context-relevant, computer-generated imagery. Aligning user gaming devices to enable a shared AR experience can be a complex problem which frequently results in inconsistent positioning of the computer-generated imagery relative to the real-word imagery. A shared coordinate space in an augmented reality session between two devices with disjoint relative coordinate spaces can be created, for example, as disclosed in co-pending U.S. patent application Ser. No. 16/277,591 filed on Feb. 15, 2019 entitled "Aligning Location for a Shared Augmented Reality Experience", which is incorporated herein by reference).

Described herein is a system and method for experiencing an AR experience (e.g., AR video game) with a shared coordinate space. During a first mode ("game play mode"), once two or more users have created a shared coordinate space in an AR game, the users engage in an AR video game in which action(s) have consequence(s) according to pre-established gaming rule(s). In a second mode ("sandbox mode"), within the shared coordinate space of the AR game, two or more user engage in a non-destructive session of the AR game in which action(s) have only temporary or limited consequence(s) according to at least some of the pre-established gaming rule(s). However, since the second mode is non-destructive, the consequence(s) are reset upon expiration of the second mode and/or in response to a game reset action.

Referring to FIG. 1, a system for sharing an augmented reality game within a shared coordinate space 100 is illustrated. The system 100 can initially create a shared coordinate space in an AR game between two or more user gaming devices. Once the shared coordinate space in the AR game has been created, during a first mode ("game play mode"), using the user gaming devices, in an AR game, the users engage in an AR video game in which action(s) have consequence(s) according to pre-established gaming rule(s). In a second mode ("sandbox mode"), within the shared coordinate space of the AR game, two or more user engage in a non-destructive session of the AR video game in which action(s) have only temporary or limited consequence(s) according to at least some of the pre-established gaming rule(s). However, since the second mode is non-destructive, the consequence(s) can be reset upon exiting of the second mode and/or in response to a game reset action.

Aligning Location for a Shared Augmented Reality Experience

The system 100 includes a shared coordinate space creation component 110 that creates a shared coordinate space in an augmented reality game between at least two devices with disjoint relative coordinate spaces. Initially, the two devices synchronize their clocks (e.g., to each other and/or to a network time server) and separately begin AR tracking. With AR tracking initiated, each device establishes its own relative coordinate space.

During an AR session (e.g., AR game), a first device displays a spatial alignment image, and optionally an AR game identifier of the AR game, which are viewable to a second device. While displaying the spatial alignment image, the first device tracks its location (e.g., six degrees of position) and at various time intervals using timestamps. The second device recognizes the spatial alignment image and records its location (e.g., six degrees of position) and timestamp of when the spatial alignment image is recognized (e.g., timestamp coinciding with location when the spatial alignment is recognized). "Six degrees of position" (also referred to as "six degrees of freedom") refers to freedom of movement of an object in three-dimensional space along three orthogonal spatial axes (e.g., x, y, and z) and a change in object orientation about three orthogonal rotation axes (e.g., yaw, pitch, and roll).

Thereafter, the second device sends a request for information to the first device, along with the timestamp of when the second device recognized the spatial alignment image. In response to the request, the first device sends to the second device the first device's location (e.g., six degrees of position) at or about the timestamp when the second device recognized the spatial alignment image, and, a spatial origin of the first device.

Using the received location and spatial origin of the first device, the second device can calculate an offset between the second device and the first device, establishing a shared coordinate space between the first device and the second device. The second device can then display virtual image(s) of the AR game being displayed by the first device in the shared coordinate space. In some embodiments, the shared coordinate space can be correct to within millimeter accuracy, that is, the second device can align its coordinate space with the coordinate space of the first device within accuracy of about a millimeter.

Figure 2:
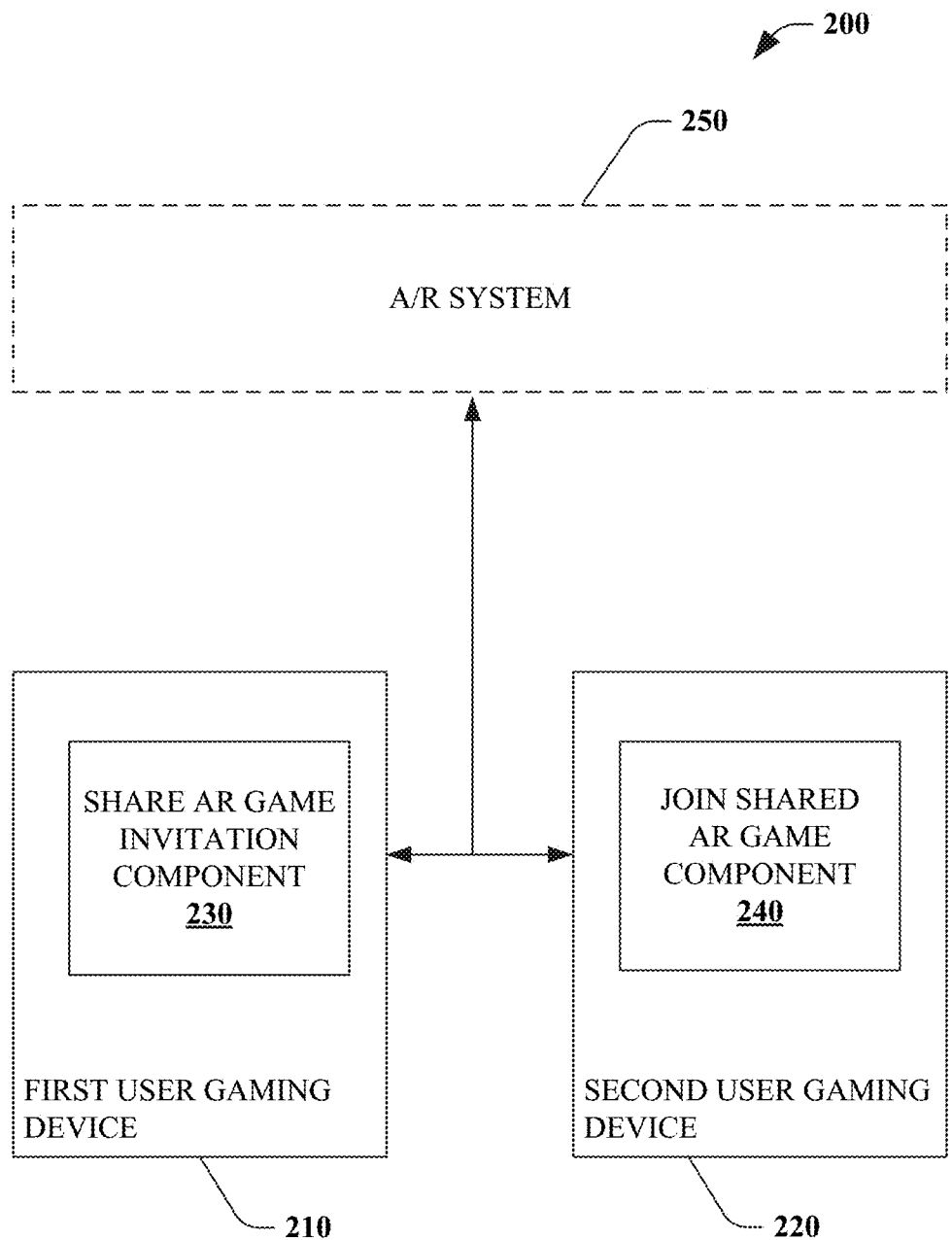
FIG. 2 is a functional block diagram that illustrates a system for creating a shared coordinate space in an augmented reality game between at least two devices with disjoint relative coordinate spaces.

Referring to FIG. 2, a system for creating a shared coordinate space in an augmented reality session (e.g., AR game) between at least two devices (with disjoint relative coordinate spaces) 200 is illustrated. The system 200 can facilitate a first user gaming device 210 sharing an AR game initially hosted on the first user gaming device 210 with one or more second user gaming device(s) 220. The first user gaming device 210 and the second user gaming device 220 are coupled to each other, for example, using a high-speed wireless network connection. In some embodiments, the shared coordinate space creation component 110 comprises a portion of the components of the system 200. In some embodiments, the shared coordinate space creation component 110 comprises all of the components of the system 200.

In some embodiments, the system 200 can overcome constraints of some conventional shared AR game systems that utilize a stationary reference object to spatially anchor user gaming devices in a shared AR game. By utilizing a stationary reference object, mobility of AR game users can be severely limited. For example, users are not free to roam through a park and decide to participate in a shared AR game. Further, many conventional shared AR systems lack the ability to spatially locate the user gaming devices with precision, resulting in inconsistent positioning of computer-generated imagery relative to the real-world imagery and a less enjoyable shared AR game.

The first user gaming device 210 includes a share AR game invitation component 230 that provides information regarding the particular AR game and a coordinate space of the first user gaming device 210 to the second user gaming device 220. The second user gaming device 220 includes a join shared AR game component 240 that coordinates communication with the first user gaming device 210 to create a shared coordinate space with the first user gaming device 210, for example, by aligning the coordinate space of the second user gaming device 220 to the coordinate space of the first user gaming device 210.

In order to share an AR game, clocks of the first user gaming device 210 and the second user gaming device 220 can be synchronized. In some embodiments, clocks of the first user gaming device 210 and the second user gaming device 220 are synchronized to each other. In some embodiments, clocks of the first user gaming device 210 and the second user gaming device 220 are synchronized to an AR system 250 (e.g., a local AR system and/or a cloud-based AR system). In some embodiments, clocks of the first user gaming device 210 and the second user gaming device 220 are synchronized to a network time server (not shown).

The first user gaming device 210 and the second user gaming device 220 separately begin AR tracking (e.g., identifying feature points) such that each user gaming device 210, 220 has its own relative coordinate space. For example, the first user gaming device 210 has its own spatial origin (e.g., 0, 0, 0 of a three-dimensional Cartesian coordinate system) and the second user gaming device 220 has its own spatial origin (e.g., 0, 0, 0 of another three-dimensional Cartesian coordinate system). In some embodiments, coordinates are expressed as Cartesian coordinates (X, Y, Z). In some embodiments, coordinates are expressed as or global coordinates (latitude, longitude, height).

A user of the first user gaming device 210 can place virtual object(s) and/or virtual encounter(s) within an AR game. Thereafter, the user of the first user gaming device 210 can initiate sharing of the AR game with a user of the second user gaming device 220. The first user gaming device 210 and the second user gaming device 220 can share information regarding respective users (e.g., player identifier) either directly and/or through the AR system 250.

The share AR game invitation component 230 can display a spatial alignment image on the first user gaming device 210 viewable by the second user gaming device 220. The user of the first user gaming device 210 can further provide an AR game identifier to the user of the second user gaming device 220 to identify the particular AR game. In some embodiments, the AR game identifier can be a globally unique identifier (e.g., GUID). In some embodiments, the AR game identifier can be a multi-dimensional barcode (e.g., a quick response or "QR" code, Aztec code, a data matrix code, a dataglyph, a MaxiCode, a PDF417 code, an Ultra Code, a UCC RSS-2D bar code, and/or other optical code) displayed on the first user gaming device 210 by the share AR game invitation component 230 and viewable by the second user gaming device 220. In some embodiments, the AR game identifier can be electronically communicated from the first user gaming device 210 to the second user gaming device 220, for example, based upon express user input (e.g., share AR game identifier command) and/or received electronically based upon proximity of the first user gaming device 210 to the second user gaming device 220 and display of the spatial alignment image on the first user gaming device 210.

Figure 3:
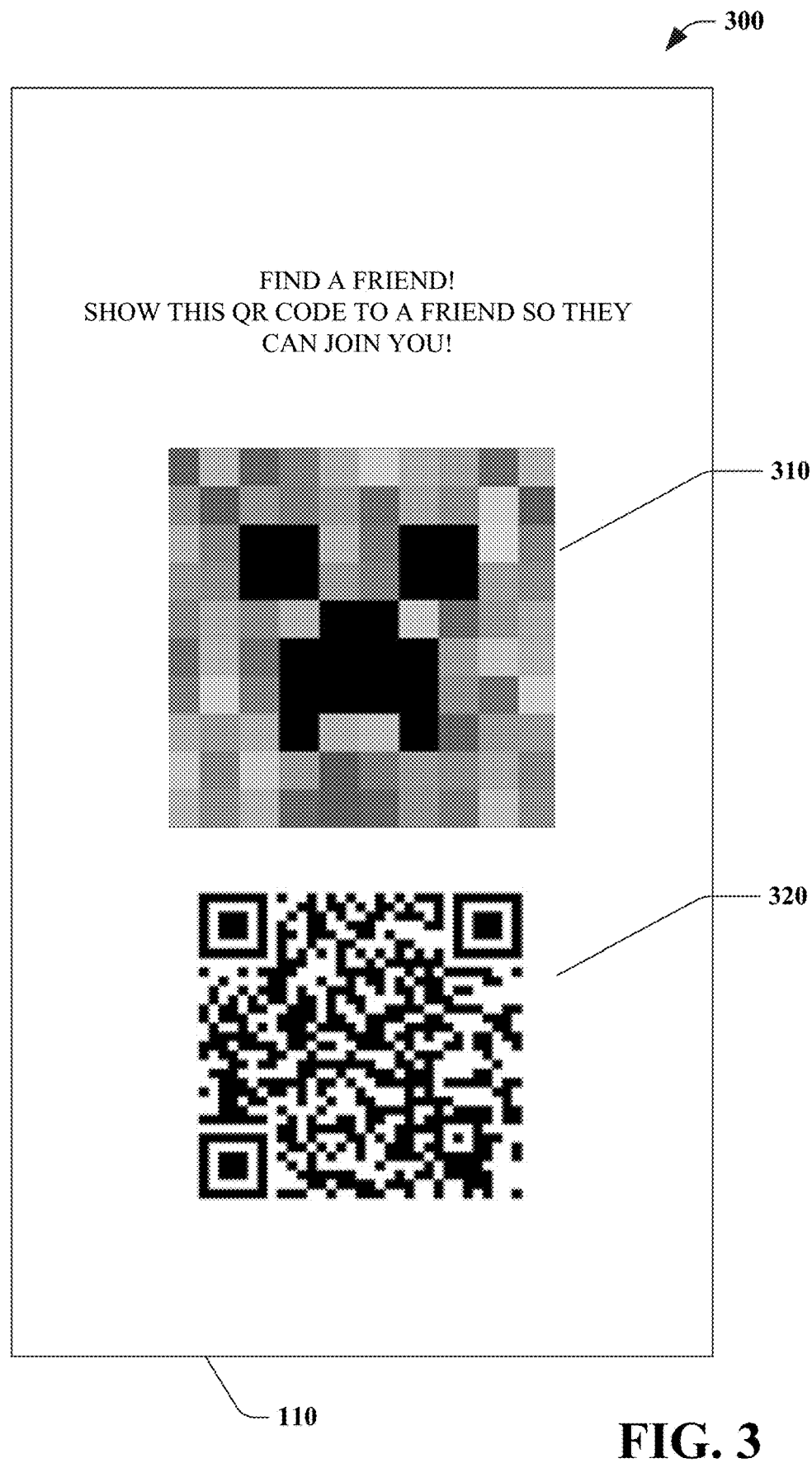
FIGS. 3 and 4 are exemplary user interfaces.

Turning briefly to FIG. 3, an exemplary user interface 300 displayed on the first user gaming device 210 is illustrated. The user interface 300 includes a spatial alignment image 310 that allows a second user gaming device 220 to determine its location relative to the first user gaming device 210. In some embodiments, the spatial alignment image 310 is displayed at a predetermined size and with a plurality of features (e.g., predefined specific groupings of pixels of predefined colors and/or predefined intensity(ies)) that allow the second user gaming device 220 to determine its location/position (e.g., six degrees of position) relative to the first user gaming device 210. The user interface 300 further include a multi-dimensional barcode 320 that uniquely identifies a particular AR game (e.g., identifier).

Referring back to FIG. 2, while displaying the spatial alignment image, the share AR game invitation component 230 tracks (e.g., stores) location information regarding the first user gaming device 210 (e.g., information regarding six degrees of position of the first user gaming device) at various time intervals using timestamps (e.g., associated with each of the locations of the first user gaming device 210).

In some embodiments, the second user gaming device 220 can infer a user's desire to initiate joining of the AR game. For example, based, at least in part, upon proximity of the second user gaming device 220 to the first user gaming device 210, the join shared AR game component 240 can infer the user's desire to initiate joining of the AR game.

Figure 4:
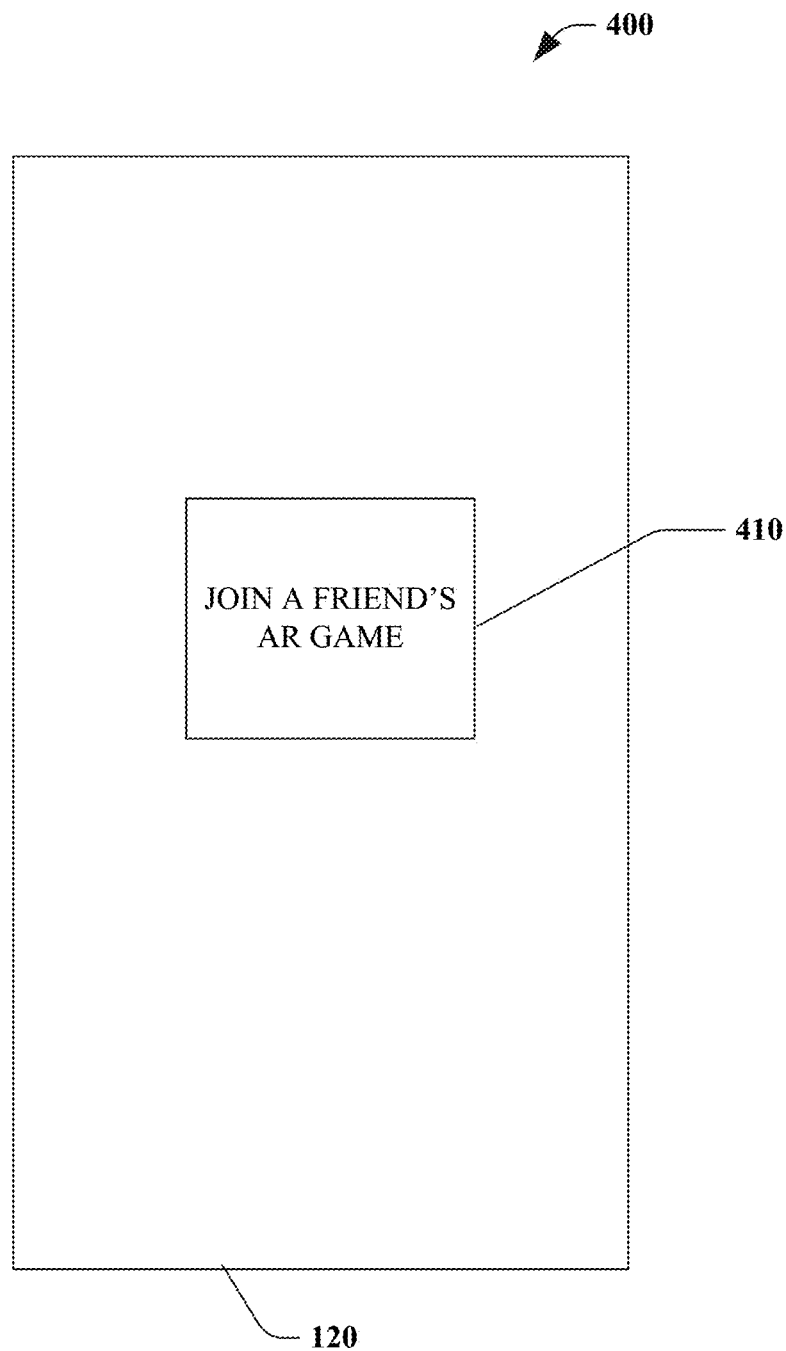

In some embodiments, the user of the second user gaming device 220 can expressly initiate joining of the AR game. Turning briefly to FIG. 4, an exemplary user interface 400 includes a "join a friend's AR game" control 410 selection of which causes the join shared AR game component 240 to initiate joining of the AR game.

Referring back to FIG. 2, the join shared AR game component 240 of the second user gaming device 220 can utilize the displayed spatial alignment image (e.g., using one or more cameras (not shown) of the second user gaming device 220) to spatially link the second user gaming device 220 to the first user gaming device 210. The join shared AR game component 240 can record location information (e.g., six degrees of position) and a timestamp of when the second user gaming device 220 was spatially linked to the first user gaming device 210 (e.g., location and timestamp of when the spatial alignment image was recognized).

Thereafter, the second user gaming device 220 sends a request for information to the first user gaming device 210, along with the timestamp of when the spatial linked by the second user gaming device 220 occurred. In response to the request, the first user gaming device 210 sends to the second user gaming device 220 the location (e.g., six degrees of position) of the first user gaming device 210 at or about the timestamp when the second user gaming device 220 was spatially linked to the first user gaming device 210, and, a spatial origin of the first user gaming device.

Using the received location and spatial origin of the first user gaming device 220, along with the spatial origin of the second user gaming device 220, and the recorded location of the second user gaming device 220 when the second user gaming device 220 was spatially linked to the first user gaming device 210, the join shared AR game component 240 can calculate an offset between the second user gaming device 220 and the first user gaming device 210. The join shared AR game component 240 can utilize the calculated offset to establish a shared coordinate space between the first user gaming device 210 and the second user gaming device 220 by aligning the coordinate space of the second user gaming device 220 to the coordinate space of the first user gaming device 210.

The second user gaming device 220 and the first user gaming device 210 can then both display and/or interact with virtual image(s) of the AR game in the shared coordinate space. Once the shared coordinate space has been established, each user gaming device 210, 220 provides current location and interaction information to the other device(s), and/or to the AR system 250.

The system 200 can thus allow two or more user gaming devices to aligns their respective views of a same virtual object such that the virtual object has a same orientation regardless of perspective (e.g., viewed from any of the two or more user gamine devices). In some embodiments, the system 200 can be utilized to subsequently share the AR game with a plurality of other user gaming devices, with each of the plurality of other user gaming devices aligning their respective coordinate space with the coordinate space of the first user gaming device 210.

In some embodiments, the system 200 can be utilized as part of a multi-player AR gaming experience. For example, the AR gaming experience can allow a first user to begin building a virtual object or scene comprising a plurality of virtual objects utilizing virtual building blocks. The first user can utilize the system 200 to share the AR gaming experience with one or more other users by providing an AR game identifier and displaying a spatial alignment image viewable by user gaming devices of the other users (e.g., simultaneously viewable and/or sequentially viewable). In this manner, a plurality of users can concurrently participate in building the same virtual object or scene such that all users see the same virtual object or scene in the same orientation making for a precise and immersive multi-player AR gaming experience.

In some embodiments, the system 200 can be utilized to "anchor" a virtual object in a highly changing environment such as a household tabletop. That is, the system 200 can coordinate spatial alignment locking of the devices irrespective of characteristics of the physical environment.

In some embodiments, both the first user gaming device 210 and the second user gaming device 220 each include the share AR game invitation component 230 and the join shared AR game component 240. In this manner, each has the ability to initiate an invitation to join the shared AR game, and, to join the shared AR game.

For purposes of explanation and not limitation, the system 200 has been discussed with reference to a spatial alignment image utilized by the join shared AR game component 240 of the second user gaming device 220 to determine a spatial position of the second user gaming device 220 relative to the first user gaming device 210. In some embodiments, a spatial sound can be utilized in place of the spatial alignment image to facilitate the join shared AR game component 240 in determining the spatial position of the second user gaming device 220 relative to the first user gaming 220.

Game Mode

Referring back to FIG. 1, the system 100 further includes an augmented reality game mode component 120 that provides a first mode ("game mode") of an augmented reality game in which at least some of the plurality of users engage in game play actions that have consequences according to pre-established game rules.

In some embodiments, once a shared coordinate space in the AR game has been established, users can experience one of two modes during the AR game. In the first mode ("game play mode"), using the user gaming devices, in an AR game, the users engage in an AR video game in which action(s) have consequence(s) according to pre-established gaming rule(s).

For example, the AR game can comprise an open-ended AR virtual game in user(s) virtually place block(s) and go on adventures. Users can decide what they want to do among themselves. During game mode, users can engage in a creative mode play in which players can be given limitless resources to build whatever they choose. During game mode, user can further engage in survival mode in which players explore the world and mine its resources to feed, house and/or defend themselves.

Sandbox Mode

The system 100 also includes an augmented reality sandbox mode component 130 that provides a second mode of the augmented reality game in which at least some of the plurality of users engage in non-destructive game play actions that do not have consequences once the second mode has been terminated (e.g., session-based, not permanent).

In the second mode ("sandbox mode" or "editing mode"), within the shared coordinate space of the AR game, two or more user engage in a non-destructive session of the AR game in which action(s) have only temporary or limited consequence(s) according to at least some of the pre-established gaming rule(s). However, since the second mode is non-destructive, at least some of the consequence(s) can be reset upon exiting of the second mode and/or in response to a game reset action.

In some embodiments, the AR game can comprise an open-ended AR virtual game in user(s) virtually place block(s) and go on adventures. In sandbox mode, users can experience the AR game either fully (e.g., according to game rule(s)) or in a limited manner (e.g., based on pre-defined sandbox rule(s)).

In some embodiments, users can selectively switch between game mode and sandbox mode.

Sharing Geolocation Information

Figure 5:
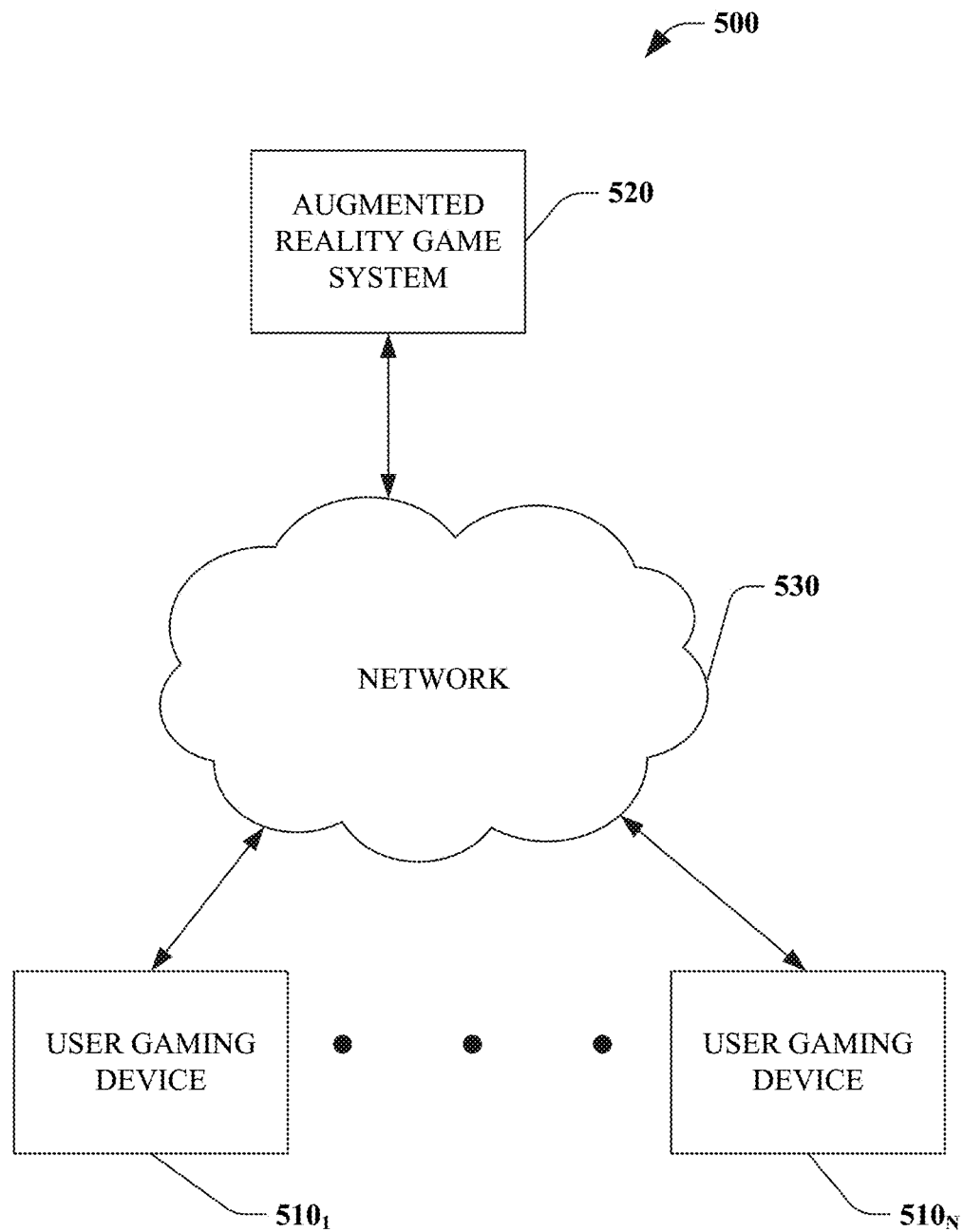
FIG. 5 is a functional block diagram that illustrates a system for using geolocation information within an AR session.

Turning to FIG. 5, a system for using geolocation information within an AR session 500 is illustrated. The system 500 includes a plurality of user gaming devices 510 coupled to an augmented reality game system 520 via a network 530 such as the Internet. Each of the user gaming device 510 has an associated physical location. In some embodiments, the augmented reality game system 520 can utilize the latitude and longitude provided by GPS by the user gaming devices 510.

The augmented reality game system 520 can join the plurality of user gaming devices 510 to an augmented reality game, session, and/or experience. Using information regarding the physical location of the plurality of user gaming devices 510, with respect to a first user gaming device 510, the augmented reality game system 520 can determine a second user gaming device 510 having a physical location within a threshold physical distance (e.g., ten feet, one hundred feet, one mile) of a physical location of the first user gaming device 510.

A user of the first user gaming device 510 can initiate a virtual action that causes a corresponding virtual action to be displayed on a map of a virtual environment that parallels at least portions of the physical environment displayed via the second user gaming device 510.

In some embodiments, the virtual action comprises an animation of an icon or other location indicator indicative of a physical relative location of the first user gaming device 510. For example, the icon can move or wave a hand icon to indicate the location of the first user gaming device 510 and willingness of the user of the first user gaming device 510 to engage in a shared augmented reality game session. In this manner, the system 500 can facilitate a collaborative mapping-based experience.

In some embodiments, the virtual action comprises an animated geo-location map indicator that is visible to other users via user gaming devices 510 (e.g., public participants). For example, instantiating an animation comprising fireworks on the map of the virtual environment is a visual effect viewable by other users based upon determined distance.

In some embodiments, within gameplay of the augmented reality game system 520 can facilitate shared geolocation boosts having social effect(s) such that effect(s) of a particular boost are only applied to users of user gaming devices 510 within the threshold distance (e.g., within a particular radius). In some embodiments, these shared geolocation boosts can apply over time and gain additional benefit with increased users participating in the gameplay.

Figure 6:
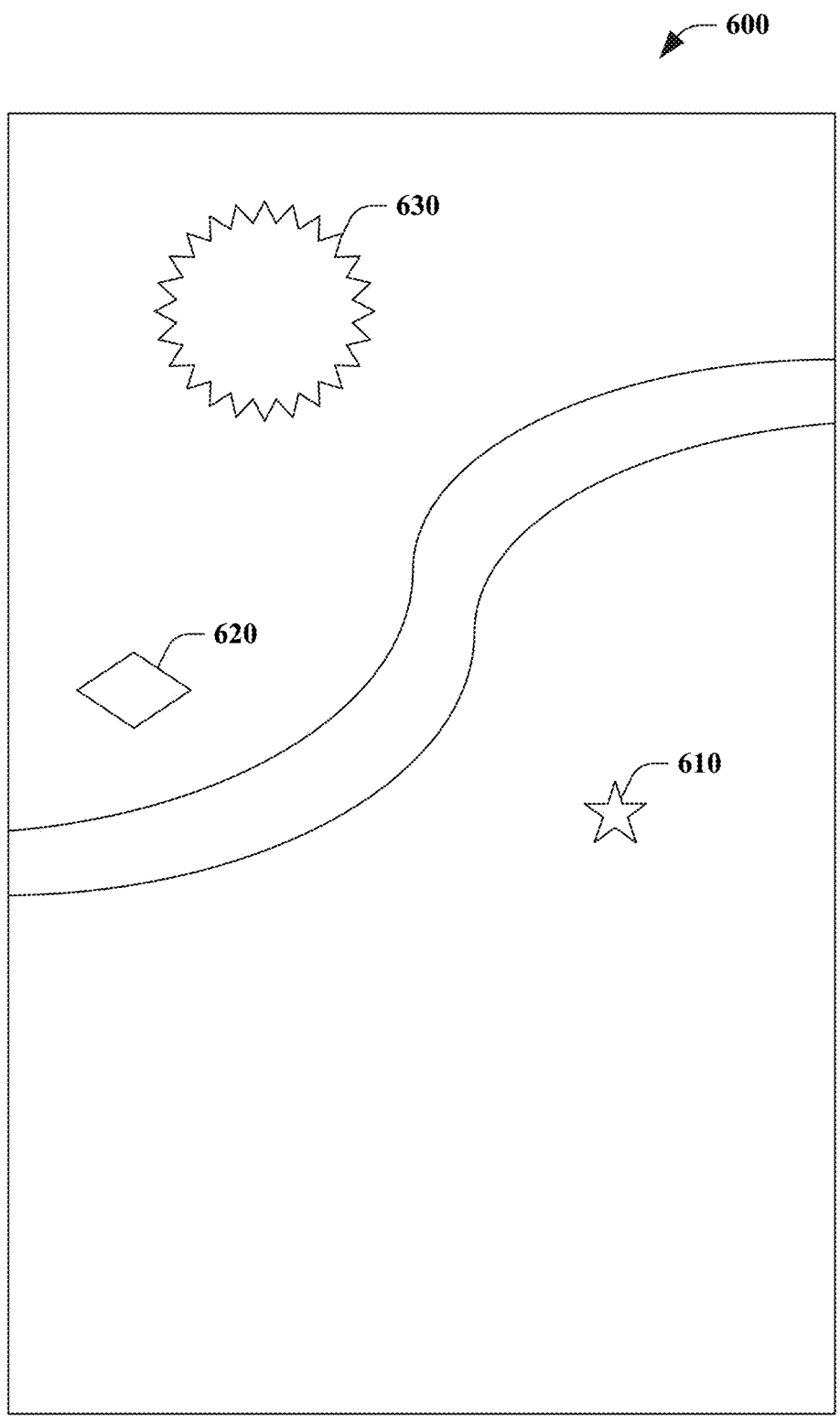
FIG. 6 is an exemplary user interface.

Referring briefly to FIG. 6, an exemplary user interface 600 is illustrated. The user interface 600 displays a map of a virtual environment that parallels at least portions of a physical environment as displayed by a second user gaming device. The user interface 600 includes a location indicator associated with the second user gaming device 610 (e.g., user's own location) and a location indicator associated with the first user gaming device 620 (e.g., location of first user).

In response to an action initiated by the first user on the first user gaming device 510, a virtual action can be displayed via the user interface 600. For example, the location indication associated with the first user gaming 620 can become animated or otherwise provide a geolocation-based signal to the second user via the user interface 600.

The user interface 600 also includes a virtual item 630 (e.g., virtual fireworks) placed or animated based upon an action initiated by the first user on the first user gaming device 510.

Figure 7:
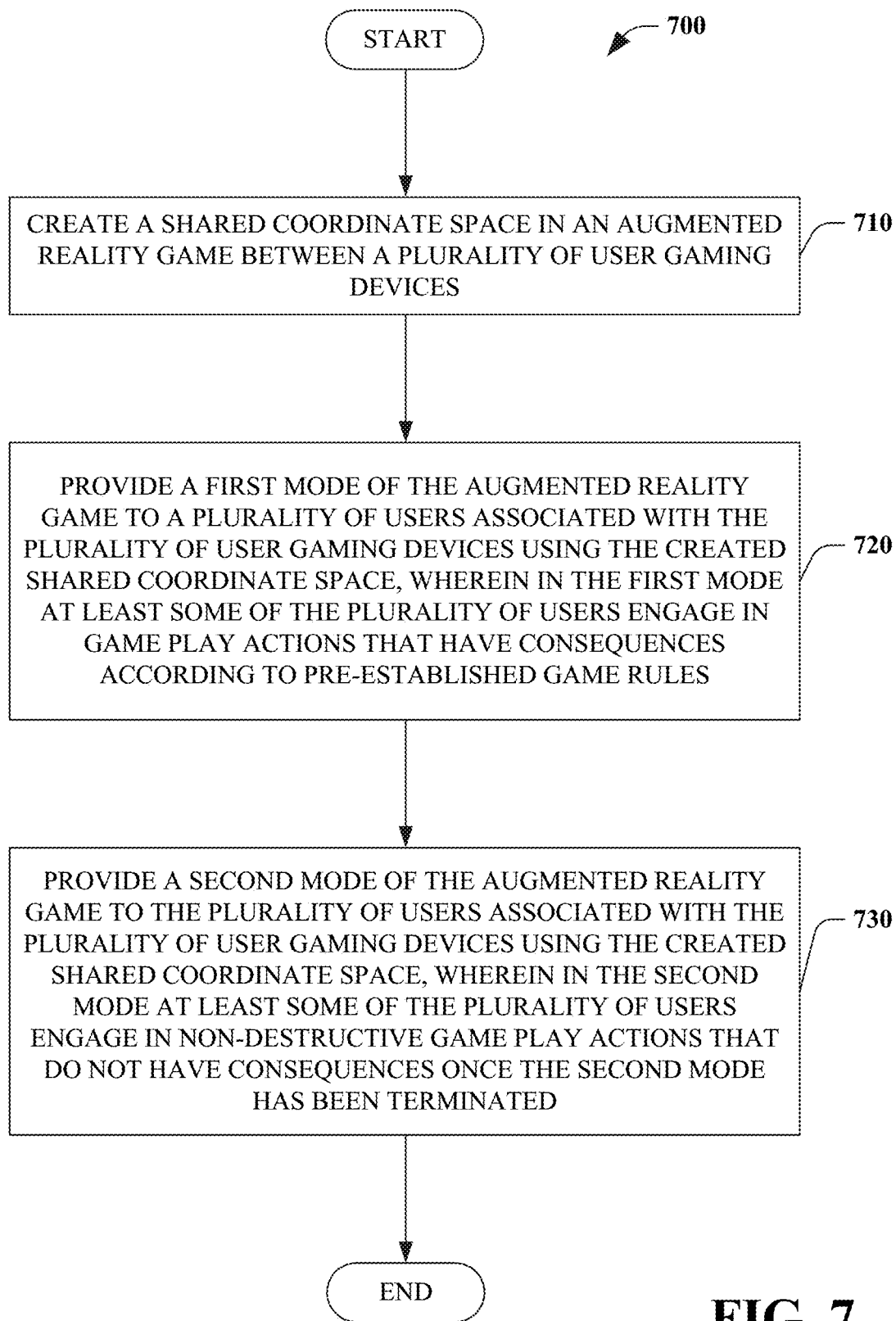
FIG. 7 is a flow chart that illustrates a method of sharing an augmented reality game within a shared coordinate space.
Figure 8:
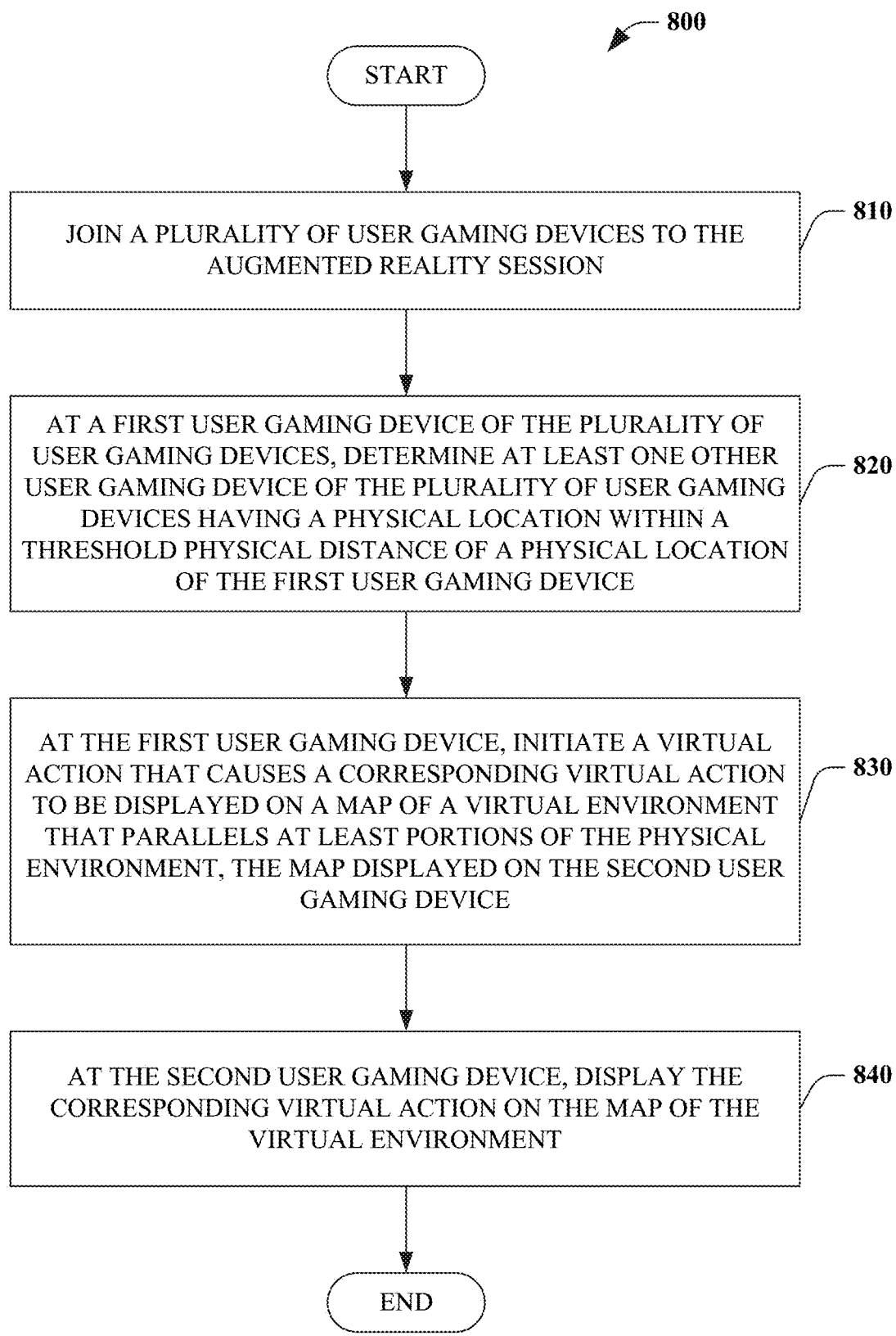
FIG. 8 is a flow chart that illustrates a method of using geolocation information within an AR session.

FIG. 7 illustrates an exemplary method of sharing an augmented reality game within a shared coordinate space. FIG. 8 illustrates an exemplary method of using geolocation information with an AR session. FIGS. 9-12 illustrate exemplary methodologies relating to creating a shared coordinate space in an augmented reality session between at least two devices with disjoint relative coordinate spaces. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 7, a method of sharing an augmented reality game (e.g., AR video game) within a shared coordinate space 700 is illustrated. In some embodiments, the method 700 is performed by the system 100.

At 710, a shared coordinate space in an augmented reality game between a plurality of user gaming devices is created. At 720, a first mode of the augmented reality game is provided to a plurality of users associated with the plurality of user gaming devices using the created shared coordinate space. In the first mode at least some of the plurality of users engage in game play actions that have consequences according to pre-established game rules. At 730, a second mode of the augmented reality game is provided to the plurality of users associated with the plurality of user gaming devices using the created shared coordinate space. In the second mode at least some of the plurality of users engage in non-destructive game play actions that do not have consequences once the second mode has been terminated (e.g., session-based, not permanent). In some embodiments, users can selectively switch between the first mode ("game mode") and the second mode ("sandbox mode").

Turning to FIG. 8, a method of using geolocation information within an AR session is illustrated. In some embodiments, the method 800 is performed by the system 500.

At 810, a plurality of user gaming devices are joined to the augmented reality game. At 820, at a first user gaming device of the plurality of user gaming devices, at least one other user gaming device of the plurality of user gaming devices having a physical location within a threshold physical distance of a physical location of the first user gaming device is determined.

At 830, at the first user gaming device, a virtual action that causes a corresponding virtual action to be displayed on a map of a virtual environment that parallels at least portions of the physical environment is initiated. The map is displayed on the second user gaming device. At 840, at second user device, the corresponding virtual action is displayed on the map of the virtual environment.

Figure 9:
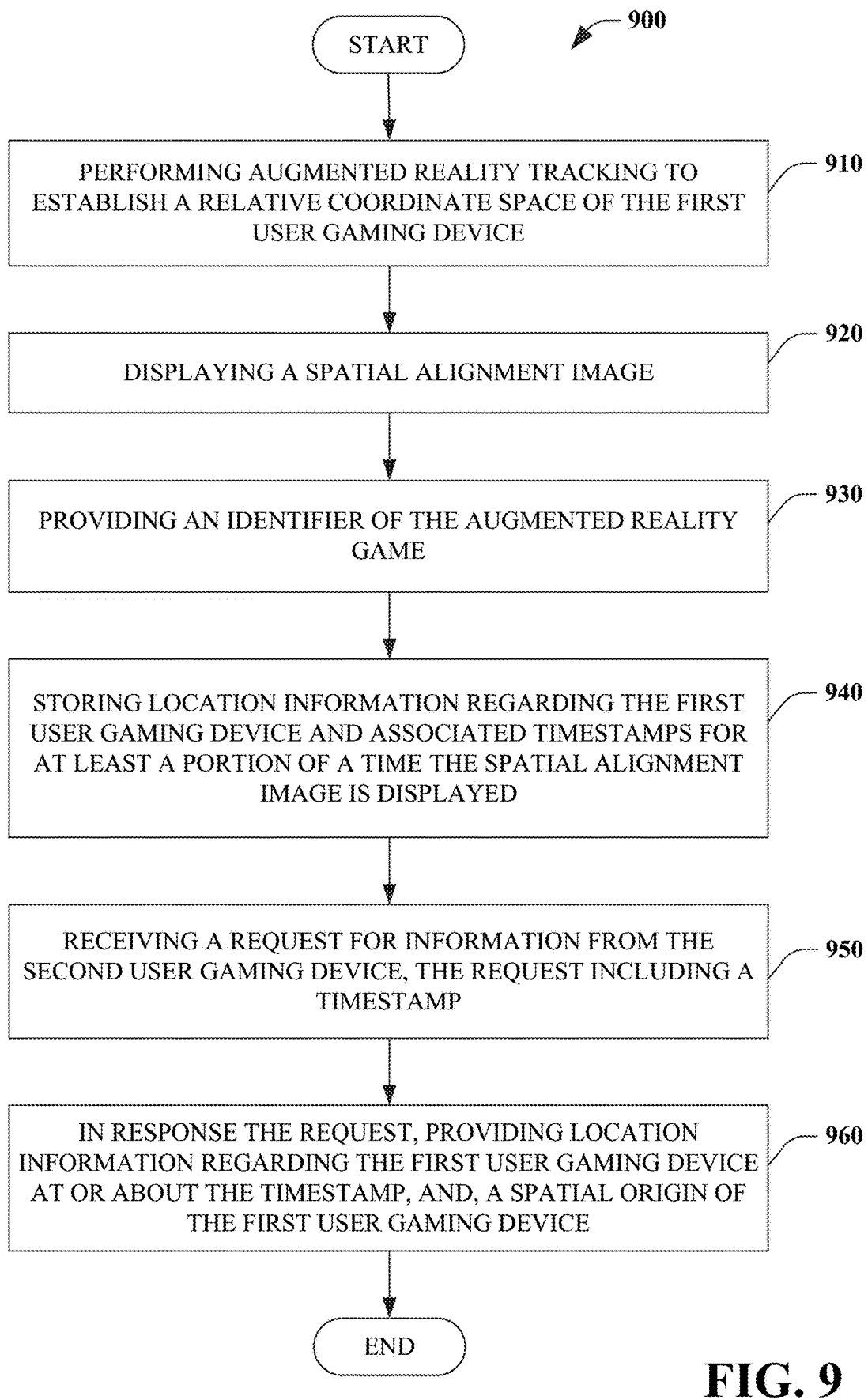
FIG. 9 is a flow chart that illustrates a method of creating a shared coordinate space in an augmented reality game between at least two devices with disjoint relative coordinate spaces by a first user gaming device.

Turning to FIG. 9, a method of creating a shared coordinate space in an augmented reality game between at least two devices with disjoint relative coordinate spaces 900 is illustrated. In some embodiments, the method 900 is performed by the first user gaming device 210.

At 910, augmented reality tracking is performed to establish a relative coordinate space of the first user gaming device. At 920, the first user gaming device displays a spatial alignment image. At 930, an identifier of the augmented reality game is provided. At 940, location information regarding the first user gaming device and associated timestamps, for at least a portion of a time the spatial alignment image is displayed, are stored.

At 950, a request for information is received from the second user gaming device, the request including a timestamp. At 960, in response the request, location information regarding the first user gaming device at or about the timestamp, and, a spatial origin of the first user gaming device is provided.

Figure 10:
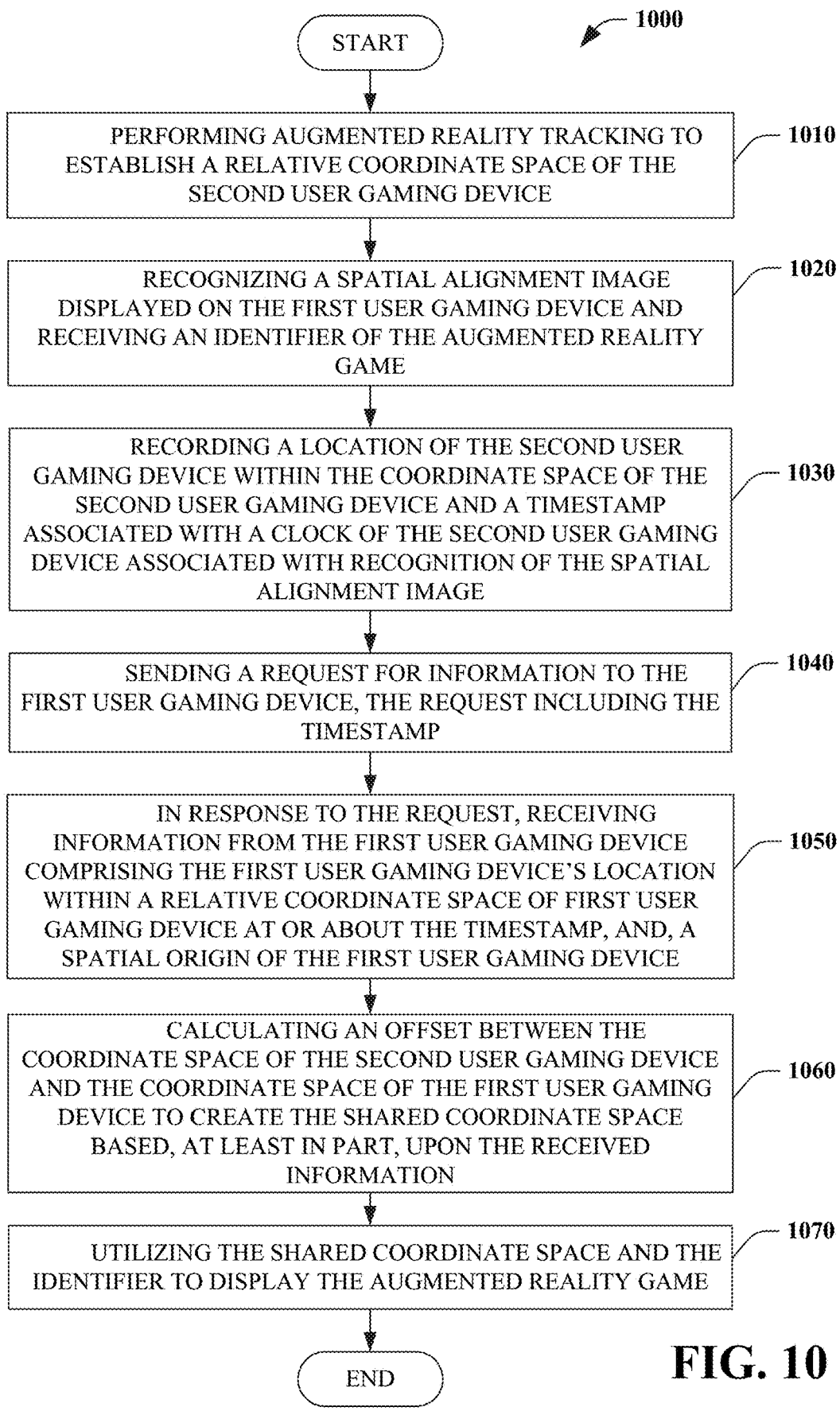
FIG. 10 is a flow chart that illustrates a method of creating a shared coordinate space in an augmented reality game between at least two devices with disjoint relative coordinate spaces by second first user gaming device.

Referring to FIG. 10, a method of creating a shared coordinate space in an augmented reality game between at least two devices with disjoint relative coordinate spaces 1000 is illustrated. In some embodiments, the method 1000 is performed by the second user gaming device 220.

At 1010, augmented reality tracking is performed to establish a relative coordinate space of the second user gaming device. At 1020, a spatial alignment image displayed on the first user gaming device is recognized, and, an identifier of the augmented reality game is received.

At 1030, a location of the second user gaming device within the coordinate space of the second user gaming device and a timestamp associated with a clock of the second user gaming device associated with recognition of the spatial alignment image are recorded.

At 1040, a request for information is sent to the first user gaming device, the request including the timestamp. At 1050, in response to the request, information is received from the first user gaming device comprising the first user gaming device's location within a relative coordinate space of first user gaming device at or about the timestamp, and, a spatial origin of the first user gaming device.

At 1060, an offset between the coordinate space of the second user gaming device and the coordinate space of the first user gaming device is calculated and used to create the shared coordinate space based, at least in part, upon the received information (e.g., the first user gaming device's location within the relative coordinate space of first user gaming device at or about the timestamp, and, the spatial origin of the first user gaming device). At 1070, the shared coordinate space and the identifier is utilized to display the augmented reality game.

Figure 11:
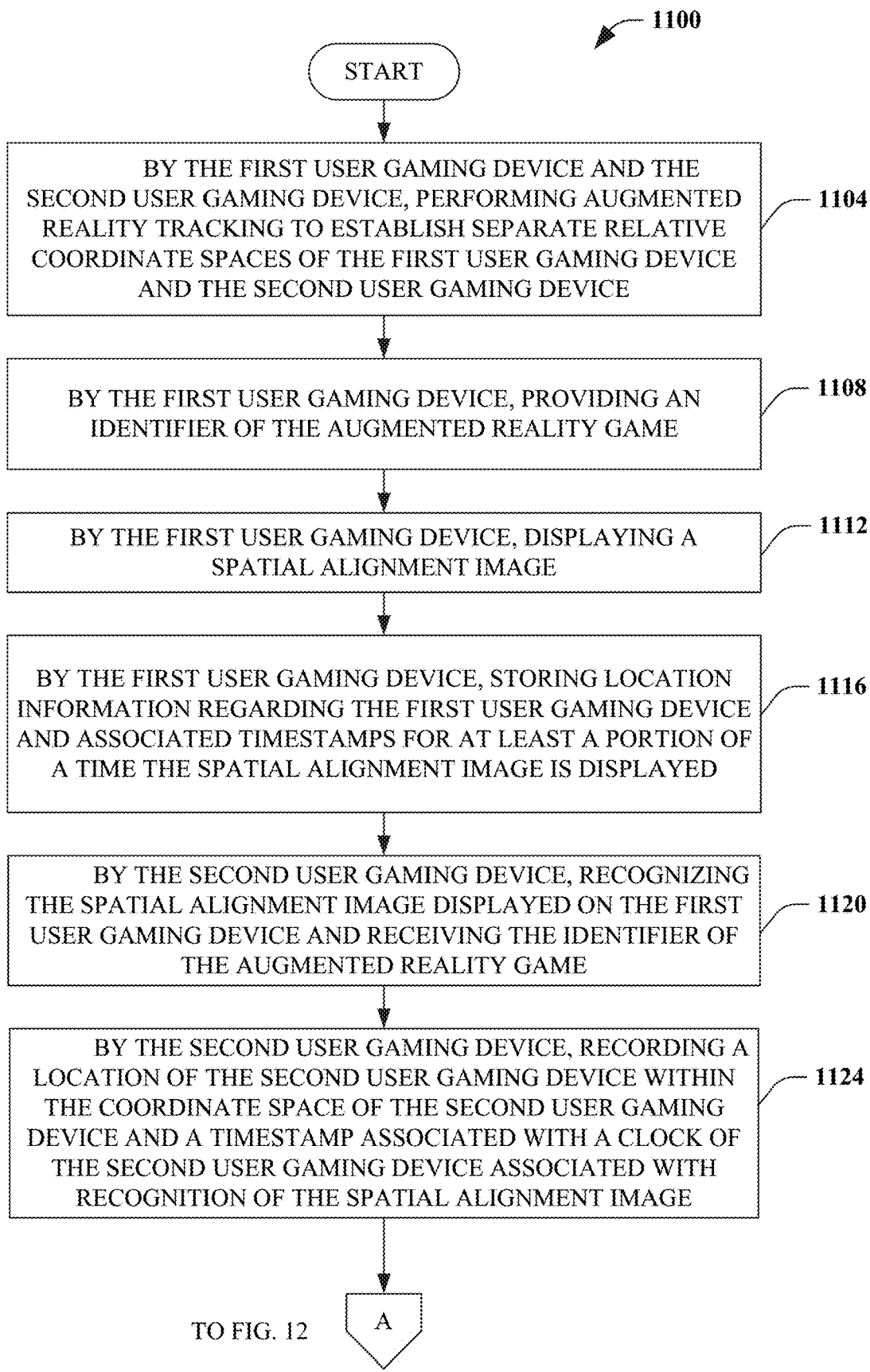
FIGS. 11 and 12 are flow charts that illustrate a method of creating a shared coordinate space in an augmented reality game between at least two devices with disjoint relative coordinate spaces.
Figure 12:
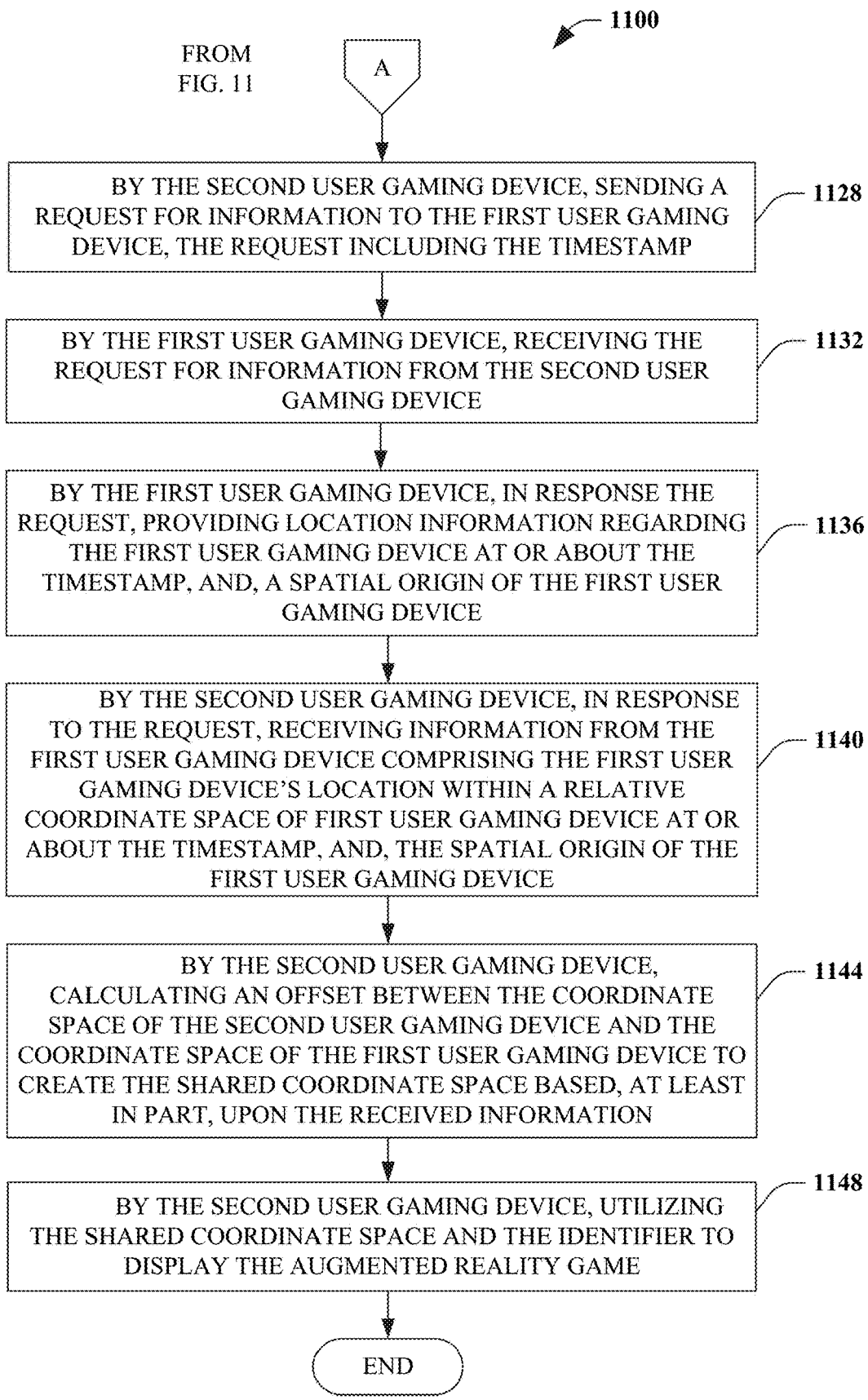

Next, referring to FIGS. 11 and 12, a method of creating a shared coordinate space in an augmented reality game between at least two devices with disjoint relative coordinate spaces 1100 is illustrated. In some embodiments, the method 1100 is performed by the system 200.

At 1104, by the first user gaming device and the second user gaming device, augmented reality tracking is performed to establish separate relative coordinate spaces of the first user gaming device and the second user gaming device.

At 1108, an identifier of the augmented reality game is provided by the first user gaming device. At 1112, a spatial alignment image is displayed by the first user gaming device. At 1116, location information regarding the first user gaming device (e.g., locations within the relative coordinate space of the first user gaming device), and, associated timestamps for at least a portion of a time the spatial alignment image is displayed by the first user gaming device is stored by the first user gaming device.

At 1120, the spatial alignment image displayed on the first user gaming device is recognized by the second user gaming device. The identifier of the augmented reality game is further received by the second user gaming device.

At 1124, a location of the second user gaming device within the coordinate space of the second user gaming device and a timestamp associated with a clock of the second user gaming device associated with recognition of the spatial alignment image is recorded by the second user gaming device. At 1128, by the second user gaming device, sending a request for information is sent to the first user gaming device by the second user gaming device. The request includes the timestamp.

At 1132, the request for information from the second user gaming device is received by the first user gaming device. At 1136, in response the request, the first user gaming device provides (to the second user gaming device) location information regarding the first user gaming device at or about the timestamp, and, a spatial origin of the first user gaming device.

At 1140, by the second user gaming device, in response to the request, information is received from the first user gaming device comprising the first user gaming device's location within a relative coordinate space of first user gaming device at or about the timestamp, and, the spatial origin of the first user gaming device. At 1144, the second user gaming device calculates an offset between the coordinate space of the second user gaming device and the coordinate space of the first user gaming device to create the shared coordinate space based, at least in part, upon the received information (e.g., the first user gaming device's location within the relative coordinate space of first user gaming device at or about the timestamp, and, the spatial origin of the first user gaming device). At 1148, the second user gaming device utilizes the shared coordinate space and the identifier to display/engage in the augmented reality game.

Described herein is a system for sharing an augmented reality game within a shared coordinate space, comprising: a computer comprising a processor and a memory having computer-executable instructions stored thereupon which, when executed by the processor, cause the computer to: create a shared coordinate space in the augmented reality game between a plurality of user gaming devices; provide a first mode of the augmented reality game to a plurality of users associated with the plurality of user gaming devices using the created shared coordinate space, wherein in the first mode at least some of the plurality of users engage in game play actions that have consequences according to pre-established game rules; and provide a second mode of the augmented reality game to the plurality of users associated with the plurality of user gaming devices using the created shared coordinate space, wherein in the second mode at least some of the plurality of users engage in non-destructive game play actions that do not have consequences once the second mode has been terminated.

The system can further include wherein the pre-established rules are determined and agreed to by at least some of the plurality of users. The system can further include wherein creating the shared coordinate space in the augmented reality game between the plurality of user gaming devices comprises the plurality of user gaming devices comprising a first user gaming device and a second gaming device, and wherein by the second user gaming device: performs augmented reality tracking to establish a relative coordinate space of the second user gaming device; recognizes a spatial alignment image displayed on the first user gaming device and receive an identifier of the augmented reality game; records a location of the second user gaming device within the coordinate space of the second user gaming device and a timestamp associated with a clock of the second user gaming device associated with recognition of the spatial alignment image; sends a request for information to the first user gaming device, the request including the timestamp; in response to the request, receives information from the first user gaming device comprising the first user gaming device's location within a relative coordinate space of first user gaming device at or about the timestamp, and, a spatial origin of the first user gaming device; calculates an offset between the coordinate space of the second user gaming device and the coordinate space of the first user gaming device to create the shared coordinate space based, at least in part, upon the received information; and utilizes the shared coordinate space and the identifier to display the augmented reality game.

The system can further include wherein the spatial alignment image is displayed at a predetermined size and with a plurality of features comprising a predefined specific groupings of pixels of predefined colors and predefined intensities that allow the second user gaming device to determine its location in six degrees of position relative to the first user gaming device. The system can further include wherein by the second user gaming device synchronizes the clock of the second user gaming device to a clock of the first user gaming device. The system can further include wherein the game identifier is displayed on the first user gaming device and comprises a multi-dimensional barcode.

The system can further include wherein the augmented reality game comprises a multi-party augmented reality building video game. The system can include the memory having further computer-executable instructions stored thereupon which, when executed by the processor, cause the computer to: display a virtual object associated with the augmented reality game on a display of the first user gaming device and a display of the second user gaming device. The system can further include wherein the second user gaming device comprises a mobile phone.

Described herein is a method of sharing an augmented reality game within a shared coordinate space, comprising: creating a shared coordinate space in an augmented reality game between a plurality of user gaming devices; providing a first mode of the augmented reality game to a plurality of users associated with the plurality of user gaming devices using the created shared coordinate space, wherein in the first mode at least some of the plurality of users engage in game play actions that have consequences according to pre-established game rules; and providing a second mode of the augmented reality game to the plurality of users associated with the plurality of user gaming devices using the created shared coordinate space, wherein in the second mode at least some of the plurality of users engage in non-destructive game play actions that do not have consequences once the second mode has been terminated.

The method can further include wherein the plurality of user gaming devices comprises a first user gaming device and a second user gaming device, and, creating the shared coordinate space in the augmented reality game between the plurality of user gaming devices comprises: by the first user gaming device and the second user gaming device, performing augmented reality tracking to establish separate relative coordinate spaces of the first user gaming device and the second user gaming device; by the first user gaming device, providing an identifier of the augmented reality game; by the first user gaming device, displaying a spatial alignment image; by the first user gaming device, storing location information regarding the first user gaming device and associated timestamps for at least a portion of a time the spatial alignment image is displayed; by the second user gaming device, recognizing the spatial alignment image displayed on the first user gaming device and receiving the identifier of the augmented reality game; by the second user gaming device, recording a location of the second user gaming device within the coordinate space of the second user gaming device and a timestamp associated with a clock of the second user gaming device associated with recognition of the spatial alignment image; by the second user gaming device, sending a request for information to the first user gaming device, the request including the timestamp; by the first user gaming device, receiving the request for information from the second user gaming device, the request including the timestamp; by the first user gaming device, in response the request, providing location information regarding the first user gaming device at or about the timestamp, and, a spatial origin of the first user gaming device; by the second user gaming device, in response to the request, receiving information from the first user gaming device comprising the first user gaming device's location within a relative coordinate space of first user gaming device at or about the timestamp, and, the spatial origin of the first user gaming device; by the second user gaming device, calculating an offset between the coordinate space of the second user gaming device and the coordinate space of the first user gaming device to create the shared coordinate space based, at least in part, upon the received information; and by the second user gaming device, utilizing the shared coordinate space and the identifier to display the augmented reality game.

The method can further include wherein the spatial alignment image is displayed at a predetermined size and with a plurality of features comprising a predefined specific groupings of pixels of predefined colors and predefined intensities that allow the second user gaming device to determine its location in six degrees of position relative to the first user gaming device.

The method can further include further synchronizing the clock of the second user gaming device to a clock of the first user gaming device. The method can further include wherein the game identifier is displayed on the first user gaming device and comprises a multi-dimensional barcode. The method can further include wherein the augmented reality game comprises a multi-party augmented reality building video game. The method can further include displaying a virtual object associated with the augmented reality game on the first user gaming device and the second user gaming device.

Described herein is a method of using geolocation information within an augmented reality session, comprising: joining a plurality of user gaming devices to the augmented reality session; at a first user gaming device of the plurality of user gaming devices, determining at least one other user gaming device of the plurality of user gaming devices having a physical location within a threshold physical distance of a physical location of the first user gaming device; and at the first user gaming device, initiating a virtual action that causes a corresponding virtual action to be displayed on a map of a virtual environment that parallels at least portions of the physical environment, the map displayed on the second user gaming device.

The method can further include wherein the corresponding virtual action comprises movement of a virtual object representing the location of the first user gaming device. The method can further include wherein the corresponding virtual action comprises an animation of a virtual object to be displayed on the map. The method can further include wherein at the second user gaming device, displaying the corresponding virtual action on the map of the virtual environment.

Figure 13:
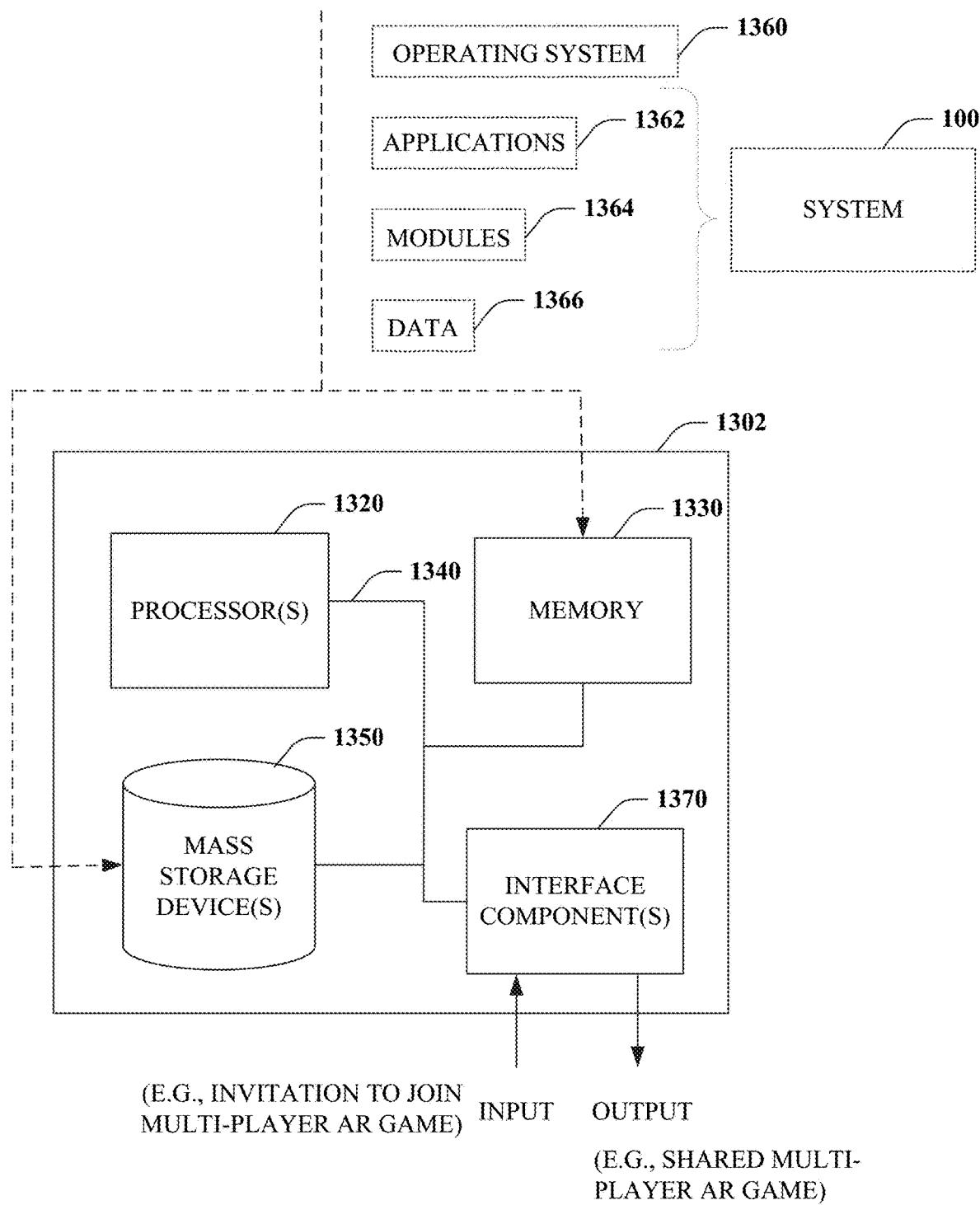
FIG. 13 is a functional block diagram that illustrates an exemplary computing system.

With reference to FIG. 13, illustrated is an example general-purpose computer or computing device 1302 (e.g., mobile phone, desktop, laptop, tablet, watch, server, handheld, programmable consumer or industrial electronics, set-top box, game system, compute node, etc.). For instance, the computing device 1302 may be used in a system for sharing an augmented reality game within a shared coordinate space 100 and/or a system for using geolocation information within an AR session 500.

The computer 1302 includes one or more processor(s) 1320, memory 1330, system bus 1340, mass storage device(s) 1350, and one or more interface components 1370. The system bus 1340 communicatively couples at least the above system constituents. However, it is to be appreciated that in its simplest form the computer 1302 can include one or more processors 1320 coupled to memory 1330 that execute various computer executable actions, instructions, and or components stored in memory 1330. The instructions may be, for instance, instructions for implementing functionality described as being carried out by one or more components discussed above or instructions for implementing one or more of the methods described above.

The processor(s) 1320 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1320 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1320 can be a graphics processor.

The computer 1302 can include or otherwise interact with a variety of computer-readable media to facilitate control of the computer 1302 to implement one or more aspects of the claimed subject matter. The computer-readable media can be any available media that can be accessed by the computer 1302 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EE-PROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1302. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1330 and mass storage device(s) 1350 are examples of computer-readable storage media. Depending on the exact configuration and type of computing device, memory 1330 may be volatile (e.g., RAM), non-volatile (e.g., ROM, flash memory, etc.) or some combination of the two. By way of example, the basic input/output system (BIOS), including basic routines to transfer information between elements within the computer 1302, such as during start-up, can be stored in nonvolatile memory, while volatile memory can act as external cache memory to facilitate processing by the processor(s) 1320, among other things.

Mass storage device(s) 1350 includes removable/non-removable, volatile/non-volatile computer storage media for storage of large amounts of data relative to the memory 1330. For example, mass storage device(s) 1350 includes, but is not limited to, one or more devices such as a magnetic or optical disk drive, floppy disk drive, flash memory, or solid-state drive, or memory stick.

Memory 1330 and mass storage device(s) 1350 can include, or have stored therein, operating system 1360, one or more applications 1362, one or more program modules 1364, and data 1366. The operating system 1360 acts to control and allocate resources of the computer 1302. Applications 1362 include one or both of system and application software and can exploit management of resources by the operating system 1360 through program modules 1364 and data 1366 stored in memory 1330 and/or mass storage device(s) 1350 to perform one or more actions. Accordingly, applications 1362 can turn a general-purpose computer 1302 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1362, and include one or more modules 1364 and data 1366 stored in memory and/or mass storage device(s) 1350 whose functionality can be realized when executed by one or more processor(s) 1320.

In accordance with one particular embodiment, the processor(s) 1320 can correspond to a system on a chip (SOC) or like architecture including, or in other words integrating, both hardware and software on a single integrated circuit substrate. Here, the processor(s) 1320 can include one or more processors as well as memory at least similar to processor(s) 1320 and memory 1330, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1302 also includes one or more interface components 1370 that are communicatively coupled to the system bus 1340 and facilitate interaction with the computer 1302. By way of example, the interface component 1370 can be a port (e.g., serial, parallel, PCMCIA, USB, FireWire, etc.) or an interface card (e.g., sound, video, etc.) or the like. In one example implementation, the interface component 1370 can be embodied as a user input/output interface to enable a user to enter commands and information into the computer 1302, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1370 can be embodied as an output peripheral interface to supply output to displays (e.g., LCD, LED, plasma, etc.), speakers, printers, and/or other computers, among other things. Still further yet, the interface component 1370 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
    joining a plurality of user gaming devices to an augmented reality session, the plurality of user gaming devices including at least a first user gaming device and a second user gaming device;
    determining that the second user gaming device of the plurality of user gaming devices has a second physical location within a physical environment that is within a threshold physical distance of a first physical location of the first user gaming device within the physical environment; and
    based at least on the second user gaming device being within the threshold physical distance of the first user gaming device and a first virtual action being initiated on the first user gaming device, causing a corresponding second virtual action to be displayed on a map of a virtual environment that parallels at least portions of the physical environment, the map displayed on the second user gaming device,
    wherein the second virtual action conveys willingness of a first user of the first user gaming device to engage in a shared augmented reality experience with a second user of the second user gaming device.

2. The method of claim 1, wherein the corresponding second virtual action comprises movement of a virtual object representing the first physical location of the first user gaming device.

3. The method of claim 1, wherein the corresponding second virtual action comprises an animation of a virtual object to be displayed on the map.

4. The method of claim 1, performed by a device other than the first user gaming device and the second user gaming device.

5. The method of claim 1, wherein other corresponding virtual actions are not applied to other gaming devices that are more than the threshold physical distance away from the first user gaming device.

6. The method of claim 1, further comprising:
    causing the map to be displayed on the second user gaming device with a first location indicator of the first physical location of the first user gaming device.

7. The method of claim 1, further comprising:
    causing the map to be displayed on the second user gaming device with a second location indicator of the second physical location of the second user gaming device.

8. A computer storage media storing instructions which, when executed by one or more processors, cause a computing device to perform acts comprising:
    providing an augmented reality session to a plurality of user gaming devices, the plurality of user gaming devices including at least a first user gaming device and a second user gaming device;
    determining that the second user gaming device of the plurality of user gaming devices has a second physical location within a physical environment that is within a threshold physical distance of a first physical location of the first user gaming device within the physical environment; and
    based at least on the second user gaming device being within the threshold physical distance of the first user gaming device and a first virtual action being initiated on the first user gaming device, causing a corresponding second virtual action to be displayed by the second user gaming device on a map that represents at least portions of the physical environment,
    wherein the second virtual action conveys willingness of a first user of the first user gaming device to engage in a shared augmented reality experience with a second user of the second user gaming device.

9. The computer storage media of claim 8, the acts further comprising:
    selecting a subset of user gaming devices of the plurality that are within the threshold physical distance of the first user gaming device; and
    causing respective corresponding virtual actions to be displayed on respective maps by each user gaming device of the subset.

10. The computer storage media of claim 9, wherein other corresponding virtual actions are not displayed on other maps by other user gaming devices that are further than the threshold physical distance from the first user gaming device.

11. The computer storage media of claim 8, the acts further comprising:
    causing the map to be displayed on the second user gaming device with a first location indicator of the first physical location of the first user gaming device.

12. The computer storage media of claim 11, the acts further comprising:
    causing the map to be displayed on the second user gaming device with a second location indicator of the second physical location of the second user gaming device.

13. The computer storage media of claim 12, the acts further comprising:
    causing the map to be displayed on the second user gaming device with a virtual item that is placed at a particular location by the first virtual action.

14. A system comprising:
one or more processors; and
one or more computer storage media storing instructions which, when executed by the one or more processors, cause the system to:
provide an augmented reality session to a plurality of user gaming devices, the plurality of user gaming devices including at least a first user gaming device and a second user gaming device;
determine that the second user gaming device of the plurality of user gaming devices has a second physical location within a physical environment that is within a threshold physical distance of a first physical location of the first user gaming device within the physical environment; and
based at least on the second user gaming device being within the threshold physical distance of the first user gaming device and a first virtual action being initiated on the first user gaming device, cause a corresponding second virtual action to be displayed by the second user gaming device on a map of a virtual environment that represents at least portions of the physical environment,
wherein the second virtual action conveys willingness of a first user of the first user gaming device to engage in a shared augmented reality experience with a second user of the second user gaming device.

15. The system of claim 14, wherein the instructions, when executed by the one or more processors, cause the system to:
select a subset of user gaming devices of the plurality that are within the threshold physical distance of the first user gaming device; and
cause respective corresponding virtual actions to be displayed on respective maps by each user gaming device of the subset.

16. The system of claim 15, wherein other corresponding virtual actions are not displayed on other maps by other user gaming devices that are further than the threshold physical distance from the first user gaming device.

17. The system of claim 14, wherein the instructions, when executed by the one or more processors, cause the system to:
cause the map to be displayed on the second user gaming device with a first location indicator of the first physical location of the first user gaming device.

18. The system of claim 14, wherein the instructions, when executed by the one or more processors, cause the system to:
cause the map to be displayed on the second user gaming device with a second location indicator of the second physical location of the second user gaming device.

19. The system of claim 14, wherein the instructions, when executed by the one or more processors, cause the system to:
cause the map to be displayed on the second user gaming device with a virtual item that is placed at a particular location by the first virtual action.

20. The system of claim 19, wherein the virtual item is animated.

21. The method of claim 1, wherein the second virtual action comprises waving an animated hand icon on the second user gaming device, the animated hand icon indicating the first physical location of the first user gaming device and the willingness of the first user to engage in the shared augmented reality experience with the second user.

* * * * *